INVENTORS.
Richard E. Wood
Wayne E. Niemuth
BY
ATTORNEY.

INVENTORS.
Richard E. Wood
Wayne E. Niemuth
ATTORNEY.

INVENTORS.
Richard E. Wood
BY  Wayne E. Niemuth

ATTORNEY.

United States Patent Office 3,266,999
Patented August 16, 1966

3,266,999
GAS-COOLED, WATER MODERATED
NEUTRONIC REACTOR
Richard E. Wood, Idaho Falls, Idaho, and Wayne Edgar Niemuth, Loveland, Ohio, assignors, by mesne assignments, to the United States of America as represented by the United States Atomic Energy Commission
Filed Mar. 26, 1965, Ser. No. 443,118
10 Claims. (Cl. 176—58)

This invention relates generally to neutronic reactors and more specifically to an improved gas-cooled, liquid moderated neutronic reactor which is capable of producing superheated steam for marine propulsion.

The problems encountered in utilizing reactor systems of various types in marine propulsion systems are discussed in U.S. Patent No. 3,170,846 issued to common assignee. In that discussion the advantage of a gas cooled system such as herein provided are also pointed out. It will suffice here to note that to satisfy the requirements of marine propulsion systems, the reactor should be relatively lightweight, compact, and capable of producing superheated steam.

Water moderated reactor systems tend to best fill the requirement that the reactor be compact and lightweight. This is true because of the very high slowing down power of water which permits very close lattice spacings. Slowing down power as used herein is defined as the product of the average value of the decrease in the natural logarithm of the neutron energy per collision (average logarithmic energy decrement per collision) and the macroscopic scattering cross section of the moderator for epithermal neutrons. As discussed in U.S. Patent No. 3,170,846 however, water is not satisfactory as a coolant where high temperature operation is necessitated by superheated steam requirements. In this regard, gas coolants are well known in the art for their high temperature capabilities.

The reactor system of common assignee described in U.S. Patent No. 3,170,846, represents an attempt to utilize water as a moderator while using gas as a coolant for the reasons outlined above. In that system it was found necessary to employ a calandria tank to physically contain the water moderator and separate it from the gas coolant. The use of a calandria tank is undesirable, however, in that it is normally very heavy and provides a significant increase in over-all system weight. Great fabrication expense is also to be expected in the machining and joining of large stainless steel calandria segments. The numerous penetrations which must be made through the top tube sheet of the calandria vessel for fuel channels and control rod penetrations, create difficult design and fabrication problems. Stress concentrations, for example, must be kept to a minimum in order to lessen the possibility of a rupture in the calandria. The neutron economy of a reactor system incorporating a calandria tank is also decreased somewhat due to the presence of neutron absorbing structural material adjacent the core active region.

It is, accordingly, a general object of the invention to provide an improved, water moderated, gas-cooled reactor system for marine propulsion.

Another object of the invention is to provide an improved, water-moderated, gas-cooled reactor system wherein the need for a water containing calandria tank is obviated.

Other objects of the invention will become apparent from an examination of the following description of the invention and the appended drawings, wherein.

In accordance with the present invention, an improved gas-cooled, water-moderated, active core region for a neutronic reactor is provided. A multiplicity of light-water-containing moderator tubes are spaced apart in an orderly array. A fuel region, comprising the interstitial spaces between the moderator tubes, and forming a continuous fuel matrix enveloping the tubes, is substantially filled with a multiplicity of fuel elements. Gaseous coolant is passed through the fuel region to cool the fuel elements during reactor operation.

Figure 1:
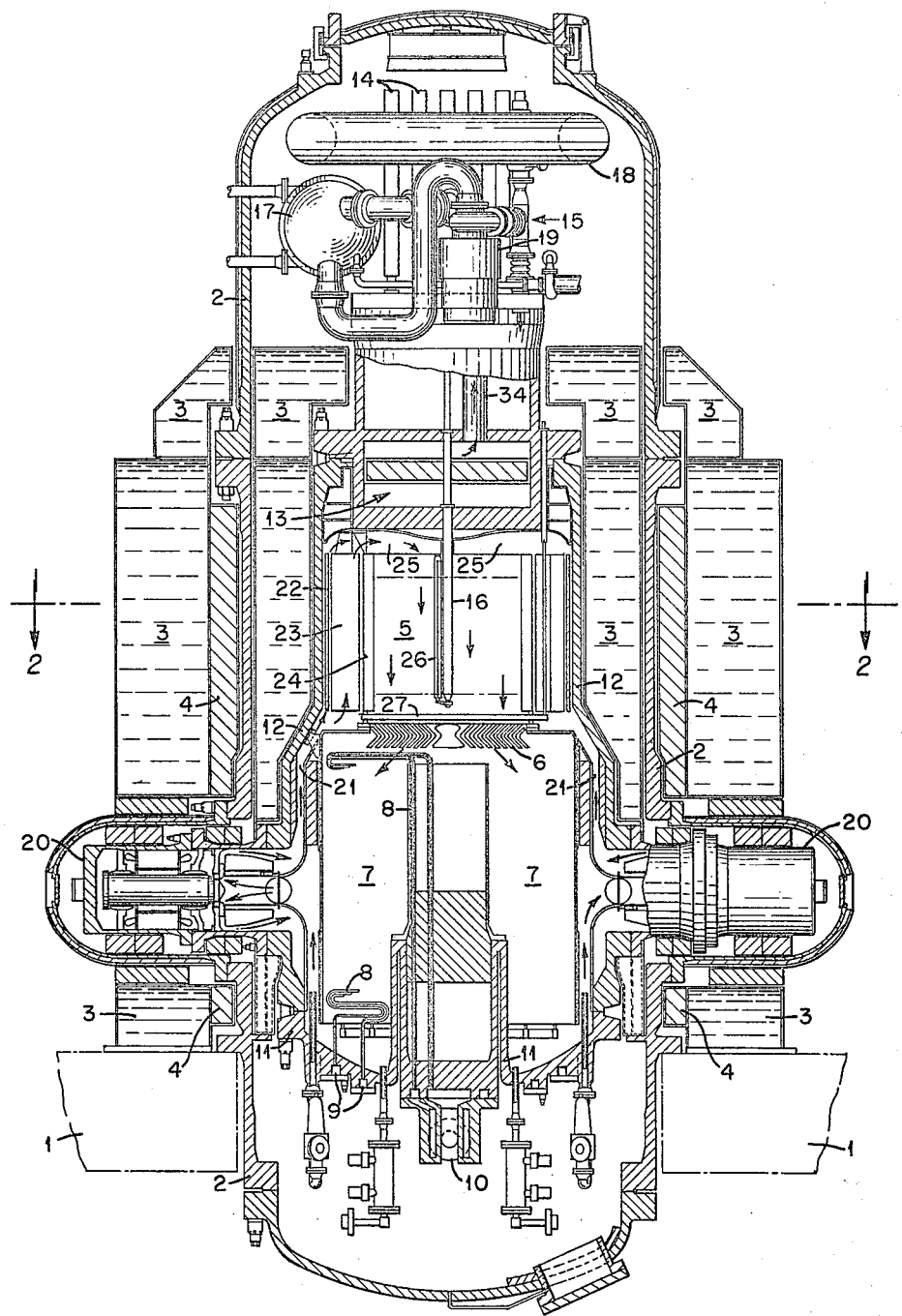
FIG. 1 is a vertical sectional view of a nuclear reactor system utilizing an active core region made in accordance with the present invention.
Figure 2:
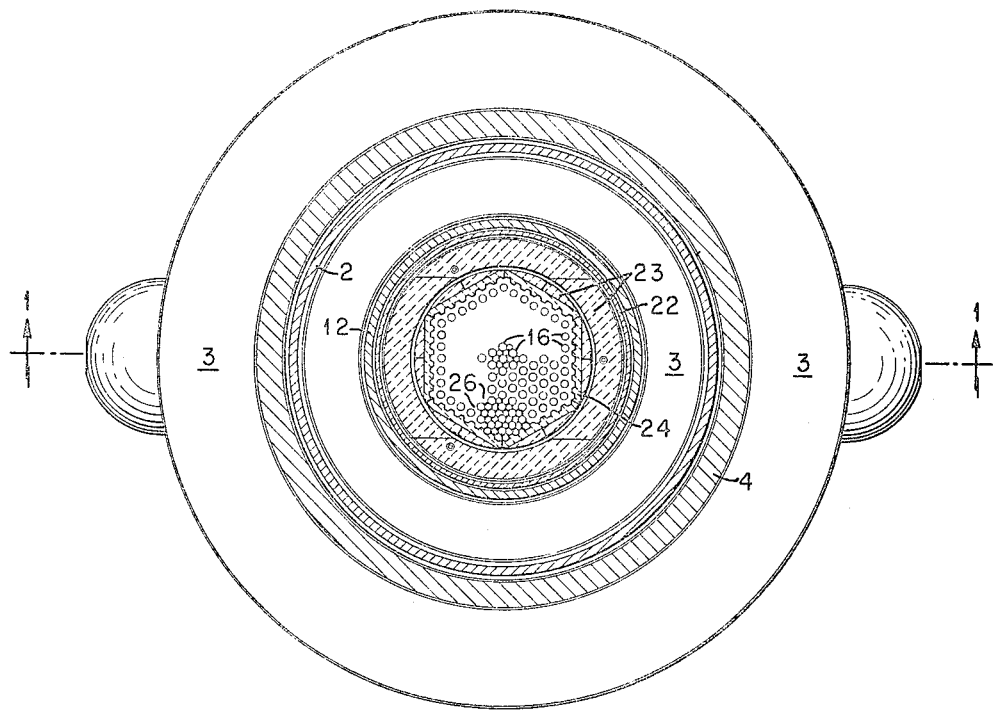
FIG. 2 is a horizontal sectional view of the reactor system of FIG. 1.

In order to facilitate an understanding of the invention, reference is made to the drawings, initially FIGS. 1 and 2, illustrating vertical and horizontal sectional views, respectively, of a nuclear reactor system utilizing an active core region made in accordance with the present invention. Similar reference numerals are used in referring to similar components in FIGS. 1 and 2 and also throughout the remaining figures.

The overall neutronic reactor system of FIGS. 1 and 2 is designed especially to satisfy the requirements of marine propulsion systems. In this regard, ship structural members 1 are shown supporting the reactor containment vessel 2, borated water shield tanks 3, and lead shields 4. Although designed primarily for marine propulsion, the reactor system is also useful for non-marine applications, in which case structural member 1 could be any convenient mounting surface. A gas-cooled, water-moderated active core region 5 is centrally located within the reactor. The gaseous coolant, which becomes heated in core region 5, passes downwardly through a boiler shield and diffuser 6 to a boiler 7 disposed immediately below boiler shield 6. The boiler supplements boiler shield 6 in shielding the area below active core region 5. The boiler comprises a multiplicity of serpentine boiler tubes 8 which begin at water headers 9 and terminate in steam headers 10. Steam headers 10 and water headers 9 are mounted in a lower tubesheet 11 which forms a lower closure for reactor pressure vessel 12. A shield plug 13 provides the top closure for pressure vessel 12. Shield plug 13 also serves as a support for the reactor core, control actuators 14, and moderator circulation and heat removal system 15; as a double plenum chamber for the circulation of moderator water through moderator tubes 16; and as a shield for the region directly above active core region 5. Shield plug 13 is described in greater particularity in a later reference to FIG. 3. Individual components of the moderator circulation and heat removal system include a heat exchanger 17, expansion tank 18 and pump 19. The direction of flow of the moderator from shield plug 13 to heat exchanger 17 and then back is indicated by arrows in FIG. 1.

Gas coolant in the primary coolant loop is circulated through the loop by two electrically driven gas circulators 20 arranged in parallel. The gas circulators are enclosed within the pressure shell so as to eliminate the need for for shaft seals. Circulator speed is regulated by controlling the frequency of the power supply. The gas coolant passes through boiler 7 to circulators 20 which pump it through passageways 21 and upwardly through the annular region surrounding active core region 5. The coolant, which is at a relatively low temperature having given up most of its heat in boiler 7, provides cooling to a thermal shield 22, graphite reflector 23, and beryllium oxide reflector 24 before discharging into coolant inlet plenum chamber 25 above active core region 5. From plenum chamber 25, the gas coolant passes downwardly through active core region 5 where it is heated in fuel elements 26, one of which is shown. The coolant then discharges from active region 5 through the boiler shield and diffuser 6 to boiler 7 where it begins the above described cycle once again. The superheated steam generated by boiler 7 may be used to drive a turbine which in turn may drive a load such as a ship's propellers.

An instrumentation harness 27 carrying thermocouple leads for measuring individual fuel element temperatures is disposed between the core active region 5 and boiler shield and diffuser 6. Individual temperature readings as indicated by the thermocouples provide a basis for adjusting the reactor power distribution.

Figure 3:
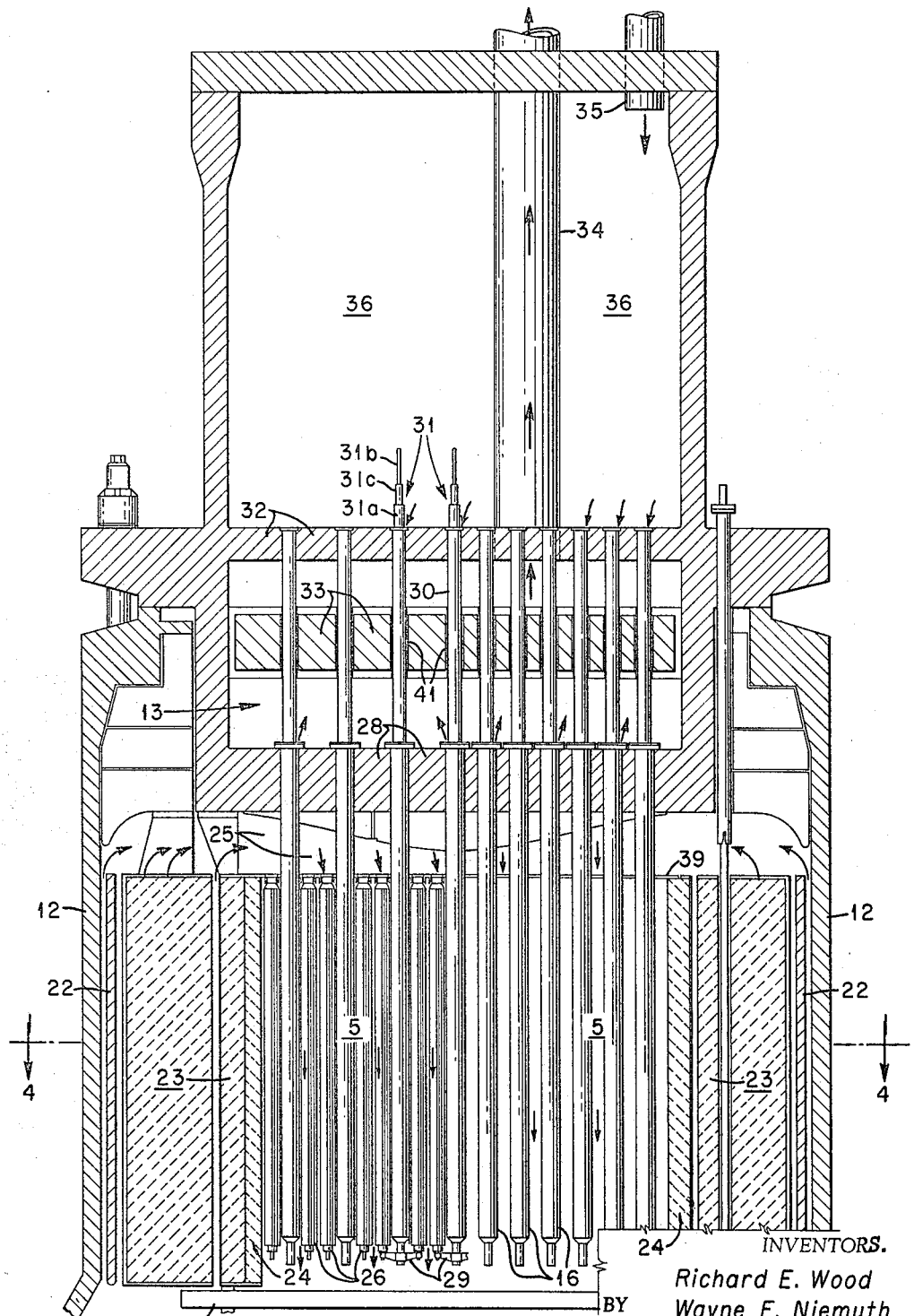
FIG. 3 is a detailed vertical sectional view of the active core region incorporated into the reactor system of FIG. 1.
Figure 4:
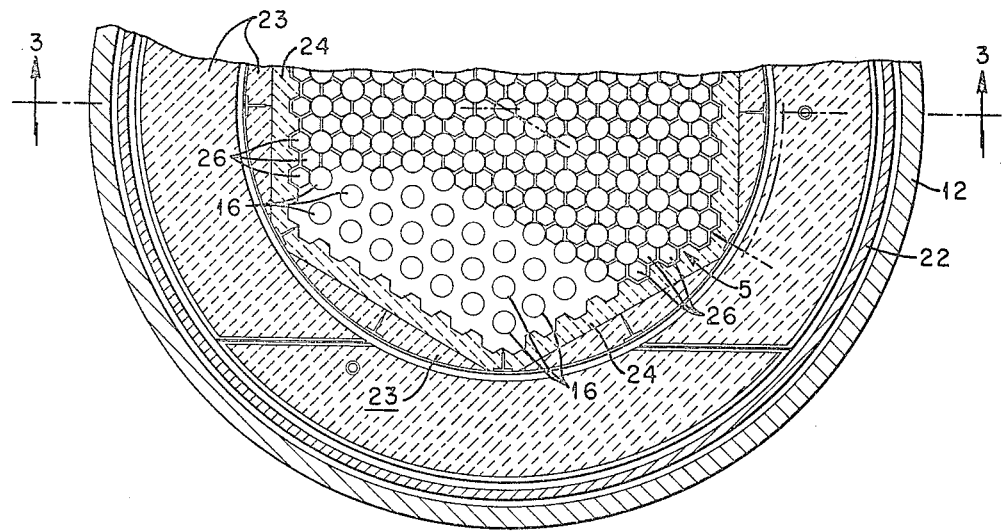
FIG. 4 is a detailed horizontal sectional view of the active core region illustrated in FIG. 3.

Referring now to FIGS. 3 and 4; a detailed view of active core portion 5, shield plug 13, and reflectors 23 and 24 is provided. A multiplicity of vertically oriented moderator tubes 16 are suspended from the lower tubesheet 28 of shield plug 13. The moderator tubes in turn support adjacent fuel elements 26 (only one shown supported in FIG. 3) through the use of fuel element holding devices 29 affixed to their lower ends. Nested concentrically within moderator tubes 16 are a water inlet tube 30 and movable water displacement shim tubes and rods 31, also referred to as shims. Water inlet tube 30 terminates in the upper tubesheet 32 of shield plug 13. A steel clad lead shield 33 is disposed horizontally about midway between tubesheets 28 and 32. Water inlet tubes 30 pass through cylindrical passageways 41 in lead shield 33 which are of larger diameter than tubes 30 so as to permit moderator water returning from moderator tubes 16 to pass upwardly through lead shield 33 into moderator return pipe 34. Moderator return pipe 34 returns the moderator water to the moderator circulation and heat removal system 15 described in the earlier reference to FIG. 1. During reactor operation, a moderator supply pipe 35 discharges moderator water which has passed through circulation and heat removal system 15, into a moderator inlet plenum 36 located above tubesheet 32. The moderator water passes from inlet plenum 36 into the annular spaces between each water inlet tube 30 and water displacement shim 31a located concentrically therein, and between the displacement shims which are provided with openings in plenum 36. The moderator water continues its passage downwardly within water inlet tube 30 and shim tubes 31 until it discharges from the lower ends thereof. After discharging from inlet tube 30 and shim tubes 31 the water passes upwardly through the annular space between inlet tube 30 and moderator tube 16 mounted concentrically therewith. The heat removed from the active core portion 5 by the circulating moderator water may be used to preheat the feedwater entering boiler 7.

As indicated above, movable water displacement shim tubes are disposed within water inlet tubes 30. The movable shim tubes are constructed of material having a lower absorption cross section for thermal neutrons and a lesser slowing down power than the water displaced. Inserting the shim tubes in effect shifts the neutron spectrum making it harder. The effect of the harder neutron spectrum together with the reduced parasitic absorption is to cause an increase in the absorption of neutrons by fertile material in the reactor fuel. This increased absorption occurs due to the presence in the hardened neutron spectrum of a much larger percentage of neutrons in the resonance absorption energy range of the fertile material. The reactor is designed so that the difference in reactivity between the conditions where the shim tubes are fully withdrawn and when they are fully inserted is substantially equal to the excess reactivity which must be provided to compensate for the usual transients (xenon, moderator, and Doppler temperature coefficients) plus about one-third of the reactivity lost through burnup. A number of safety control tubes may be provided in a manner similar to the above described shims except that they would contain neutron poison having a high absorption cross section for thermal neutrons. The safety control tubes could replace a portion of outer shim tubes 31a or be placed concentrically thereabout. The innermost shim rods 31b and first shim tubes 31c are manually movable while the outer shim tubes 31a are moved by actuators 14. Actuators 14 are also used to insert and withdraw the safety control tubes where used.

Figure 5:
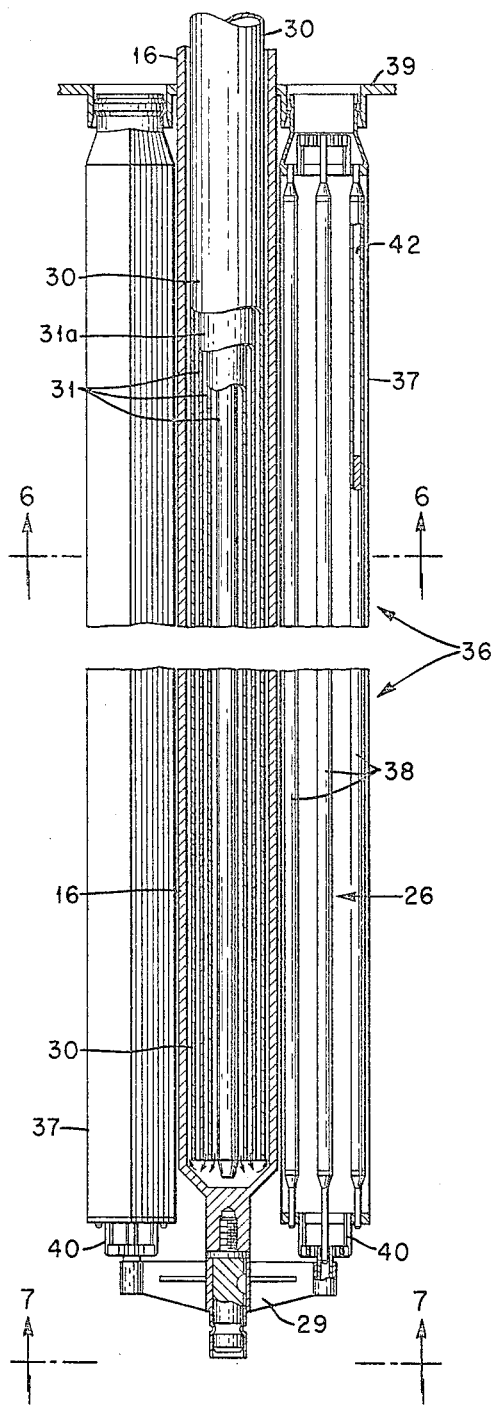
FIG. 5 is a detailed vertical sectional view, partly in plan, of a moderator-tube fuel-element cartridge assembly from the reactor active core region.
Figure 6:
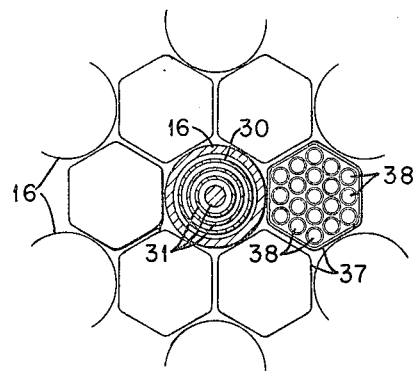
FIG. 6 is a horizontal sectional view of the cartridge assembly of FIG. 5 including adjacent assemblies.
Figure 7:
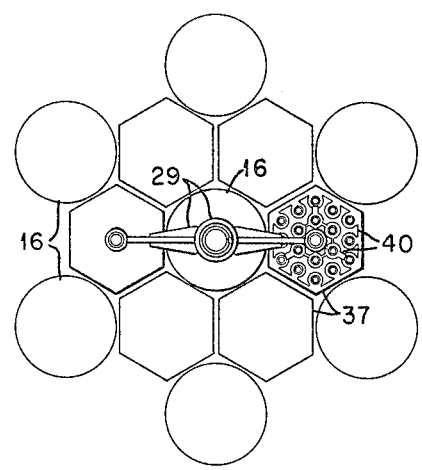
FIG. 7 is a lower plan view of the cartridge assembly of FIG. 5 illustrating the manner in which the moderator tube supports adjacent fuel elements.

FIGS. 5, 6 and 7 supplement FIGS. 3 and 4 in describing a moderator-tube fuel-element cartridge assembly 36 and its relationship to adjacent assemblies. A fuel can 37 surrounds a multiplicity of fissionable-fuel-containing fuel pins 38; thereby defining a flow channel for gaseous coolant flow over the pins. The uppermost end of each fuel can 37 fits into tube sheet 39 which lies immediately below coolant inlet plenum chamber 25 as shown in FIGS. 1 and 3. The fuel pins are supported in a spaced-apart relationship within fuel can 37 by a support spider 40. A six-inch plenum chamber 42 is provided at the top of each fuel pin 38 to accommodate gaseous fission products which escape from the fissionable fuel contained therein.

Specifications and operating conditions for one version of the presently embodied reactor system are provided in the table below.

SPECIFICATIONS AND OPERATING CONDITIONS

*General system characteristics*

Power rating:
    Shaft horsepower _____ 27,300.
    Megawatts _____ 60.43.
Primary loop characteristics:
    Primary working fluid _ Helium.
    Type of primary cycle _ Closed.
    Thermal efficiency of overall system, percent _____ 33.7.
    Helium inlet temperature to reactor, °F. _ 553.
    Helium discharge temperature from reactor, °F. _____ 1200.
    Mass flow through reactor, lb./sec. _____ 66.2.
    Heat transfer area (total in active core), ft.² _____ 1827.
    Free flow area (total in active core), in.² ___ 388.
    Primary gas loop volume, ft.³ _____ 450.
    Gas circulator outlet pressure, p.s.i.a. _____ 830.
    Gas circulator pressure ratio _____ 1.009.
Secondary loop characteristics:
    Throttle pressure, p.s.i.g. _____ 1500.
    Throttle temperature, °F. _____ 1000.
    Back pressure, inches of Hg abs. _____ 1.5.
    Feedwater flow, lb./hr. _____ 175,370.
    Final feedwater temperature, °F. _____ 415.

Number of heaters --- 5.
Feed pump power (motor driven), B.H.P. - 663.
Plant thermal efficiency, percent --- 33.7.
Steam conditions (from boiler):
    Temperature, °F. --- 1005.
    Pressure, p.s.i.g. --- 1535.
System size:
    Height, ft.-in. --- 39-1.
    Diameter, ft.-in. --- 20-3.
Operating life requirements:
    Overall system (excluding fuel and C/R), yr. --- 20.
    Fuel burnup, M$^w$ days/MT --- 20,000.
Nuclear characteristics:
    Type fuel --- Low enrichment. $UO_2$ (~5.0%).
    Fuel form --- $UO_2$.
    Moderator --- Light water.
    Fuel inventory, pounds $U^{235}$ --- ~313.
    Fuel inventory, pounds $UO_2$ --- ~7100.
Shield characteristics:
    Radiation specifications:
        Maximum general populous dose per calendar year --- Rem 5.0.
        Maximum radiation workers dose per calendar year --- Rem 5.0.
    Shield materials --- Lead, mild steel and borated water.

*Reactor specifications*

Moderator:
    Material --- Light water.
    Inlet temperature, °F. - 235.
    Outlet temperature, °F. --- 255.
    Working pressure, p.s.i.a. --- 250.
    Safety valve setting, p.s.i.g. --- 258.
    Pressure drop, p.s.i. --- 15.
    Flow rate, g.p.m. --- 1000.
    Moderator tube maximum temperature, °F. --- 450.
    Moderator tube wall thickness, in. --- 0.170.
Thermodynamic characteristics:
    Primary coolant --- Helium.
    Inlet temperature, °F. --- 553.
    Outlet temperature, °F. --- 1200.
    Inlet pressure, p.s.i.a. --- 828.
    Outlet pressure, p.s.i.a. - 824.2.
    Safety valve setting, p.s.i.g. --- 900.
    Pressure drop, p.s.i. --- 3.8.
    Dynamic head (inlet), p.s.i. --- 0.24.
    Dynamic head (maximum), p.s.i. --- 0.39.
    Mach number (inlet) - 0.0185.
    Mach number (maximum) --- 0.0238.
    Mass flow, lb./sec. --- 66.2.
    Friction factor multiplier --- 1.2.
    Free flow area, in.$^2$ --- 388.
Fuel parameters:
    Average maximum fuel pin temperature, °F. --- 1305.
    Average heat flux fuel, B.t.u./hr.-ft.$^2$ --- 102,000.
    Average heat transfer coefficient, B.t.u./hr.-ft.$^2$-°F. --- 553.
    Heat transfer coefficient multiplier (smooth tube) --- 1.2.
    Heat transfer area, ft.$^2$ - 1827.
Nuclear characteristics:
    Active core length, in. - 42.
    Active core equivalent diameter, in. --- 48.55.
    Forward reflector length, in. --- 10.
    Forward reflector material --- Light water.
    Rear reflector length, in. --- 10.
    Rear reflector material - Steel.
    Side reflector thickness (minimum), in. --- 13.
    Side reflector material - Beryllium oxide and graphite.
    Fuel loading, lb. $U^{235}$ - 313.
    Fuel loading, lb. $UO_2$ - 7100.
    Number of cells --- 127.
    Cell spacing, in. --- 3.939.
    Cell tube outside diameter, in. --- 2.460.
    Cell tube thickness, in. - 0.170.
Fuel cartridge:
    Number of fuel cartridges --- 294.
    Number of fuel pins per cartridge --- 19.
    Fuel matrix material --- $UO_2$.
    Total $UO_2$ inventory, lb. --- 7100.
    Total $U^{235}$ inventory, lb. --- 313.
    Enrichment, wt. percent --- ~5.0.
    Pitch between fuel rods, in. --- 0.433.
    Active core length, in. - 42.0.
    Cladding material --- Incoloy.
    Cladding thickness, in. - 0.015.
    Fuel pin outside diameter (average), in. --- 0.357.
Control elements:
    Dynamic tubes, actuated and manual shim tubes, type --- Moderator water displacement.
    Safety tubes, type --- Poison.
    Dynamic and manual shim tubes --- 7 cells.
    Actuated shim tubes, manual shim tubes, safety tubes --- 84 cells.
    Actuated shim tubes and manual shim tubes --- 36 cells.
    Dynamic tube material --- Zircaloy.
    Actuated and manual shim tube material --- Zircaloy Safety tubes _____ Incoloy clad (.025 thick) Cd. (.050 thick).
Number of actuated shim tube actuators _ 6.
Number of dynamic tube actuators _____ 2.
Number of safety tube actuators _____ 12.

*Shield plug*

General:
    Maximum design temperature, °F. _____ 450.
    Internal operating pressure, p.s.i.g. _____ 235.
    Internal design pressure, p.s.i.g. _____ 258.
    External operating pressure, p.s.i.g. _____ 815.
    External design pressure, p.s.i.g. _____ 900.
    Shield materials _____ Lead, water, steel.
    Structural material ___ Incoloy and SA 212B clad with Incoloy

*Boiler*

General:
    Type _____ Once-through.
    Overall height, in. ____ 125.
    Overall diameter (bottom header flange), in. _____ 124.
    Effective height over tubes, in. _____ 94.5.
    Effective outside diameter over tubes, in. __ 91.5.
Design data for normal power:
    Helium flow, lb./sec. __ 66.2.
    Water flow, lb./hr. ____ 175,370.
    Duty, $10^6$ B.t.u./hr. ___ 192.5.
    Inlet helium temperature, °F. _____ 1200.
    Exit helium temperature, °F. _____ 550.
    Inlet helium pressure, p.s.i.a. _____ 824.2.
    Exit helium pressure, p.s.i.a. _____ 822.7.
    Steam pressure, p.s.i.a. _ 1550.
Tubes:
    Configuration:
        Radial plane _____ Involute.
        Longitudinal plane _____ Serpentine.
    Number of tubes _____ 198.
    Average tube length, ft. _____ 204.
    Tube pitch, in. _____ 0.781.
    Tube outside diameter, in. _____ 0.625.
    Wall thickness, in. ____ 0.085.
Condensate demineralizer system:
    Exchangers:
        Number required _ 2.
        Type _____ Mixed bed.
        Maximum inlet temperature, °F. _____ 100.
        Maximum inlet pressure, p.s.i.g. _____ 100.
        Maximum pressure drop, p.s.i. ____ 35.
        Capacity (each), g.p.m. _____ 300.
        Inlet water total solids, p.p.m. __ 5.
        Maximum outlet water total solids, p.p.m. __ 0.1.
        Weight, lb. _____ 10,400.
    Regeneration equipment _____ Semi-automatic.

*Pressure vessel*

General:
    Normal operating temperature, °F. _____ 600.
    Design temperature, °F. _____ 700.
    Normal operating pressure, p.s.i.a. _____ 830.
    Design pressure, p.s.i.g. _____ 900.
    Safety valve setting, p.s.i.g. _____ 900.
    Material _____ SA 212B.

*Side shield*

General:
    Shield materials _____ Steel, lead, water+0.6 wt. percent boron.
    Water inlet temperature, °F. _____ 105.
    Water outlet temperature, °F. _____ 120.
    Shield maximum temperature, °F. _____ 150.
    Water pressure _____ Atmospheric.
    Water flow rate, g.p.m. _____ 30.

*Total shielded containment vessel*

Design temperature, °F. __ <650.
Design pressure, p.s.i.g. ____ <535.
Material _____ SA 201B (A300), carbon steel, and lead.
Overall height, ft.-in. _____ 39–1.
Net volume, ft.$^3$ _____ 1400.
Inside diameter, in. _____ 144.
Diameter across circulators, ft.-in. _____ 24–3.

*Primary coolant circulators*

Normal operation:
    Working fluid _____ Helium.
    Number of units ____ 2.
    Power rating per unit, B.H.P. _____ 250.
    Normal inlet temperature, °F. _____ 550.
    Normal outlet temperature, °F. _____ 553.
    Normal maximum inlet pressure, p.s.i.a. ____ 822.7.
    Normal maximum exit pressure, p.s.i.a. ____ 830.
    Pressure ratio _____ 1.009.
    Maximum flow, lb./sec. _____ 66.2.

*Emergency operation*

Loss of helium, pressurized with air:
    Working fluid _____ Air.
    Working fluid flow, lb./sec. _____ 240.
    Power output, S.H.P. _ 18,000.
    Working fluid temperature, °F. _____ 550/1200.
    Operating pressure, p.s.i.a. _____ 830.

Pressure ratio _____ 1.012.
Circulator power,
  B.H.P. (total) _____ 480.
Loss of helium, depressurized to 50 p.s.i.a.:
  Airflow, lb./sec. _____ 20.
  Circulator power,
    B.H.P. _____ 130.
  Pressure ratio _____ 1.04.

The modulator displacement shim control system described in reference to FIG. 3 provides an effective means of providing a gross radial power profile by appropriately adjusting the shims in individual moderator channels. Other advantages which arise from using a moderator tube type arrangement include: a better heat release path in the event of a loss of flow accident, a decreased fine radial power perturbation, and the deletion of a calandria and associated interstitial shim control rods.

The above description of one embodiment of the invention was offered for illustrative purposes only and should not be interpreted in a limited sense. For example, fuel enrichment, type and geometry could be changed, air substituted for helium as primary coolant or the fuel elements and moderator tubes oriented horizontally without exceeding the scope of the invention. It is, accordingly, intended that the invention be limited only by the scope of the claims appended hereto.

What is claimed is:

1. An improved gas-cooled, water-moderated active core region for a neutronic reactor comprising: a multiplicity of moderator tubes spaced apart in an orderly array, light water moderator being disposed within said moderator tubes, and a multiplicity of fuel elements substantially filling the interstitial space between said moderator tubes to form a continuous fuel matrix enveloping said moderator tubes, gaseous coolant being passed through said fuel elements to cool them during reactor operation.

2. The improvement of claim 1 wherein said gaseous coolant is helium.

3. An improved gas-cooled, water-moderated active core region for a neutronic reactor comprising: a multiplicity of moderator tubes spaced apart in an orderly array, light water moderator being disposed within said moderator tubes, and a multiplicity of pin-type fuel elements substantially filling the interstitial space between said moderator tubes to form a continuous fuel matrix enveloping said moderator tubes, gaseous coolant being passed axially through said fuel elements to cool them during reactor operation.

4. An improved gas-cooled, water-moderated active core region for a neutronic reactor comprising: a multiplicity of moderator tubes spaced apart in an orderly array, light water moderator being disposed within said moderator tubes, and a multiplicity of fuel elements substantially filling the interstitial space between said moderator tubes to form a continuous fuel matrix enveloping said moderator tubes, gaseous coolant being passed through said fuel elements to cool them during reactor operation, said moderator tubes providing support to said fuel elements.

5. An improved gas-cooled, water-moderated active core region for a neutronic reactor comprising: a multiplicity of moderator tubes spaced apart in an orderly array, light water moderator being disposed within said moderator tubes, at least one axially movable control member disposed within each of said moderator tubes, said control members being constructed of material having a lower absorption cross section for thermal neutrons and a lesser slowing down power than light water, and a multiplicity of fuel elements substantially filling the interstitial space between said moderator tubes to form a continuous fuel matrix enveloping said moderator tubes, gaseous coolant being passed through said fuel elements to cool them during reactor operation.

6. The improvement of claim 5 wherein said control members are constructed of zircoloy.

7. An improved gas-cooled, water-moderated active core region for a neutronic reactor comprising: a multiplicity of moderator tubes spaced apart in an orderly array, light water moderator being disposed within said moderator tubes, at least one axially movable control member disposed within each of said moderator tubes, a first portion of said control rods being constructed of material having a lower absorption cross section for thermal neutrons and a lesser slowing down power than light water, a second portion of said control rods being constructed of material having a high absorption cross section for thermal neutrons, and a multiplicity of fuel elements substantially filling the interstitial space between said moderator tubes to form a continuous fuel matrix enveloping said moderator tubes, gaseous coolant being passed through said fuel elements to cool them during reactor operation.

8. An improved gas-cooled, water-moderated active core region for a neutronic reactor comprising: a multiplicity of moderator tubes spaced apart in an orderly array, light water moderator being disposed within said moderator tubes, a tubesheet penetrated by said moderator tubes, a multiplicity of elongated fuel elements supported at one of their ends by said moderator tubes and at the other of their ends by said tubesheet, said fuel elements substantially filling the interstitial space between said moderator tubes to form a continuous fuel matrix enveloping said moderator tubes, and a plenum chamber communicating with said tubesheet, gaseous coolant passing from said plenum through said tubesheet and fuel elements during reactor operation.

9. An improved gas-cooled, water-moderated active core region for a neutronic reactor comprising: a multiplicity of vertically oriented moderator tubes spaced apart in an orderly array, light water moderator being circulated through said moderator tubes, at least one axially movable control member disposed within each of said moderator tubes, a portion of said control members being constructed of material having a lower absorption cross section for thermal neutrons and a lesser slowing down power than light water, a tubesheet penetrated by said moderator tubes, a multiplicity of elongated, vertically oriented pin-type fuel elements substantially filling the interstitial space between said moderator tubes to form a continuous fuel matrix enveloping said moderator tubes, said fuel elements being supported vertically and radially at their lower ends by said moderator tubes and radially at their upper ends by said tubesheet, and a plenum chamber communicating with said tubesheet, helium coolant passing from said plenum chamber through said tubesheet and fuel elements during reactor operation.

10. The improved active core region of claim 9 wherein a portion of said control members is constructed of material having a high absorption cross section for thermal neutrons.

References Cited by the Examiner

UNITED STATES PATENTS

| 2,999,059 | 9/1961 | Treshow | 176—42 |
| 3,170,846 | 2/1965 | Blumberg | 176—59 |
| 3,212,986 | 10/1965 | Pennington | 176—42 |

References Cited by the Applicant

FOREIGN PATENTS 962,311  7/1964  Great Britain.

L. DEWAYNE RUTLEDGE, *Primary Examiner.*